United States Patent
Huang et al.

(10) Patent No.: US 10,965,620 B2
(45) Date of Patent: *Mar. 30, 2021

(54) MULTI-DESTINATION PACKET REDACTION

(71) Applicant: Cisco Technology, Inc., San Jose, CA (US)

(72) Inventors: Chih-Tsung Huang, Burlingame, CA (US); Wei-Jen Huang, Burlingame, CA (US); Kelvin Chan, San Jose, CA (US); Chiapeng Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,485

(22) Filed: Jun. 6, 2019

(65) Prior Publication Data

US 2019/0288960 A1 Sep. 19, 2019

Related U.S. Application Data

(63) Continuation of application No. 15/623,510, filed on Jun. 15, 2017, now Pat. No. 10,361,973.

(51) Int. Cl.
*H04L 12/939* (2013.01)
*G06F 21/62* (2013.01)
(Continued)

(52) U.S. Cl.
CPC ........ *H04L 49/552* (2013.01); *G06F 21/6254* (2013.01); *H04L 49/201* (2013.01);
(Continued)

(58) Field of Classification Search
CPC ..... H04L 49/552; H04L 63/04; H04L 63/308; H04L 49/201; H04L 47/34; G06F 21/6254
See application file for complete search history.

(56) References Cited

U.S. PATENT DOCUMENTS 7,802,305 B1 9/2010 Leeds
8,086,615 B2 12/2011 Patrick et al.
(Continued)

FOREIGN PATENT DOCUMENTS

WO 00/56029 A1 9/2000

OTHER PUBLICATIONS

International Search Report and Written Opinion in counterpart International Application No. PCT/US2018/036579, dated Sep. 26, 2018, 10 pages.

*Primary Examiner* — Tejis Daya
(74) *Attorney, Agent, or Firm* — Edell, Shapiro & Finnan, LLC

(57) ABSTRACT

Presented herein are techniques for redacting mirrored network packets prior to providing the mirrored packets to an intended recipient application, such as a third-party analysis application. More specifically, a multi-destination packet redaction device obtains mirrored network traffic that comprises one or more mirrored network packets. The multi-destination packet redaction device filters the mirrored network traffic to determine an intended recipient application of the one or more mirrored network packets and applies a redaction process to redact one or more portions of at least one of the one or more mirrored network packets. The redaction process is customized based on one or more attributes of the intended recipient application.

20 Claims, 7 Drawing Sheets

(51) Int. Cl.
*H04L 29/06* (2006.01)
*H04L 12/931* (2013.01)
*H04L 12/801* (2013.01)

(52) U.S. Cl.
CPC ............ *H04L 63/04* (2013.01); *H04L 63/308* (2013.01); *H04L 47/34* (2013.01)

(56) References Cited

U.S. PATENT DOCUMENTS

| | | |
|---|---|---|
| 8,605,629 B1 * | 12/2013 | S ........................... H04M 11/00 370/259 |
| 8,706,689 B1 | 4/2014 | Adam |
| 9,552,272 B1 | 1/2017 | Liang et al. |
| 2003/0046388 A1 | 3/2003 | Milliken |
| 2005/0278565 A1 | 12/2005 | Frattura et al. |
| 2006/0123479 A1 | 6/2006 | Kumar |
| 2009/0168681 A1 | 7/2009 | Moon |
| 2013/0117802 A1 | 5/2013 | Fendt |
| 2014/0188822 A1 | 7/2014 | Das |
| 2014/0279768 A1 | 9/2014 | Rash et al. |
| 2015/0312176 A1 | 10/2015 | Jones et al. |
| 2016/0321469 A1 | 11/2016 | Bhogal et al. |
| 2017/0308320 A1 * | 10/2017 | Sharma ................ G06F 3/0608 |
| 2018/0034735 A1 | 2/2018 | Zaifman et al. |
| 2018/0248778 A1 * | 8/2018 | Vinsel .................... H04L 69/22 |
| 2018/0367472 A1 | 12/2018 | Huang et al. |

* cited by examiner

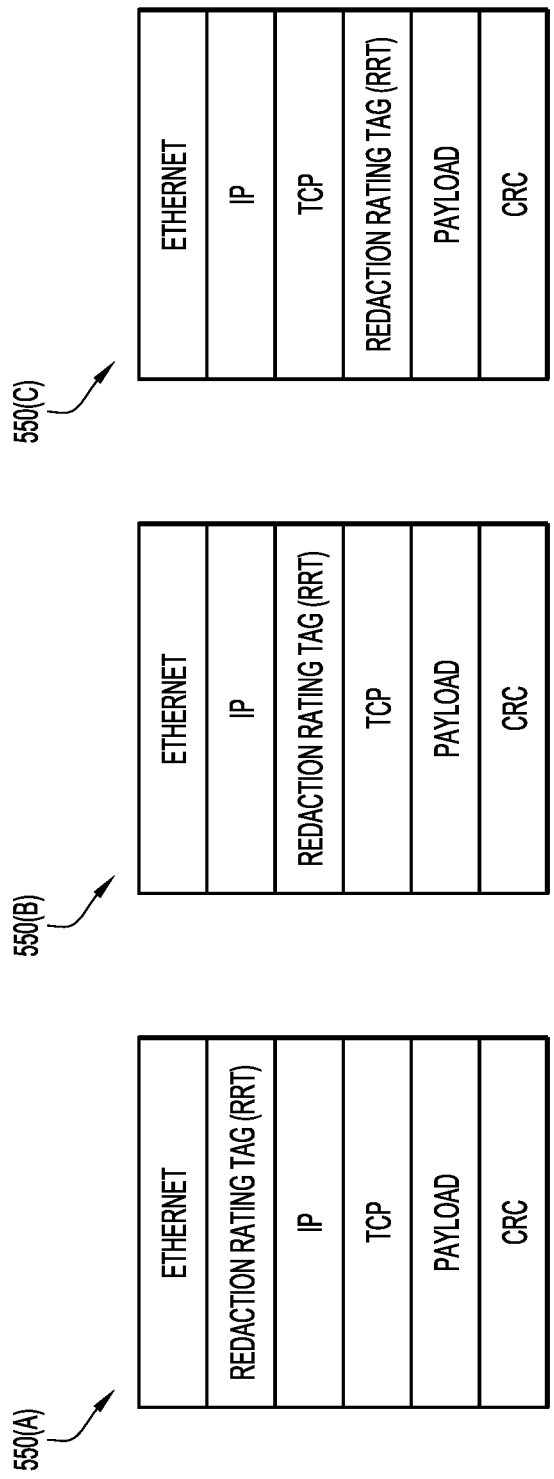

MULTI-DESTINATION PACKET REDACTION

CROSS-REFERENCE TO RELATED APPLICATION

This application is a continuation of and claims benefit to U.S. patent application Ser. No. 15/623,510, filed Jun. 15, 2017, the entire contents of which are incorporated herein by reference.

TECHNICAL FIELD

The present disclosure relates to redaction of multi-destination network traffic packets.

BACKGROUND

In a computing network, data is generally transmitted in the form of network packets (sometimes referred to as datagrams, segments, blocks, cells, frames, or packets) according to predefined protocols, such as the Transmission Control Protocol/Internet Protocol (TCP/IP). A sequence of network packets transmitted from a source device to a destination device is referred to as a network flow or network traffic.

Network packets generally comprise network data (control information) and payload data (i.e., a "payload"). The network data is, in general, data that intermediate network devices (e.g., switches, routers, etc.) use to forward the packet from the source device to the destination device. This network/networking data may comprise, for example, information in Layer 1/2/3/4/5/6/7 headers, such as source and destination addresses (e.g., source and destination Media Access Control (MAC) addresses), error detection codes (i.e., checksums), sequencing information, etc. The network data is generally found in a portion of the packet referred to as the packet header (i.e., the information that precedes the payload) and/or the packet trailer (i.e., the information that follows the payload).

The network data (e.g., Layer 1/2/3/4/5/6/7 headers) and/or the payload data included within the network packets may be used to analyze/monitor (e.g., diagnosis, audit, etc.) the state and/or quality of the computing network. In certain circumstances, this analysis may be performed by an outside vendor/third-party using a subset or portion of multi-destination (e.g., mirrored/copied) network traffic that is sent between a source and a destination.

BRIEF DESCRIPTION OF THE DRAWINGS

FIG. 5A is a schematic diagram illustrating the inclusion of Redaction Rating Tag into a network packet, according to an example embodiment.

FIG. 5B is another schematic diagram illustrating the inclusion of Redaction Rating Tag into a network packet, according to an example embodiment.

FIG. 5C is another schematic diagram illustrating the inclusion of Redaction Rating Tag into a network packet, according to an example embodiment.

DESCRIPTION OF EXAMPLE EMBODIMENTS

Overview

Figure 1:
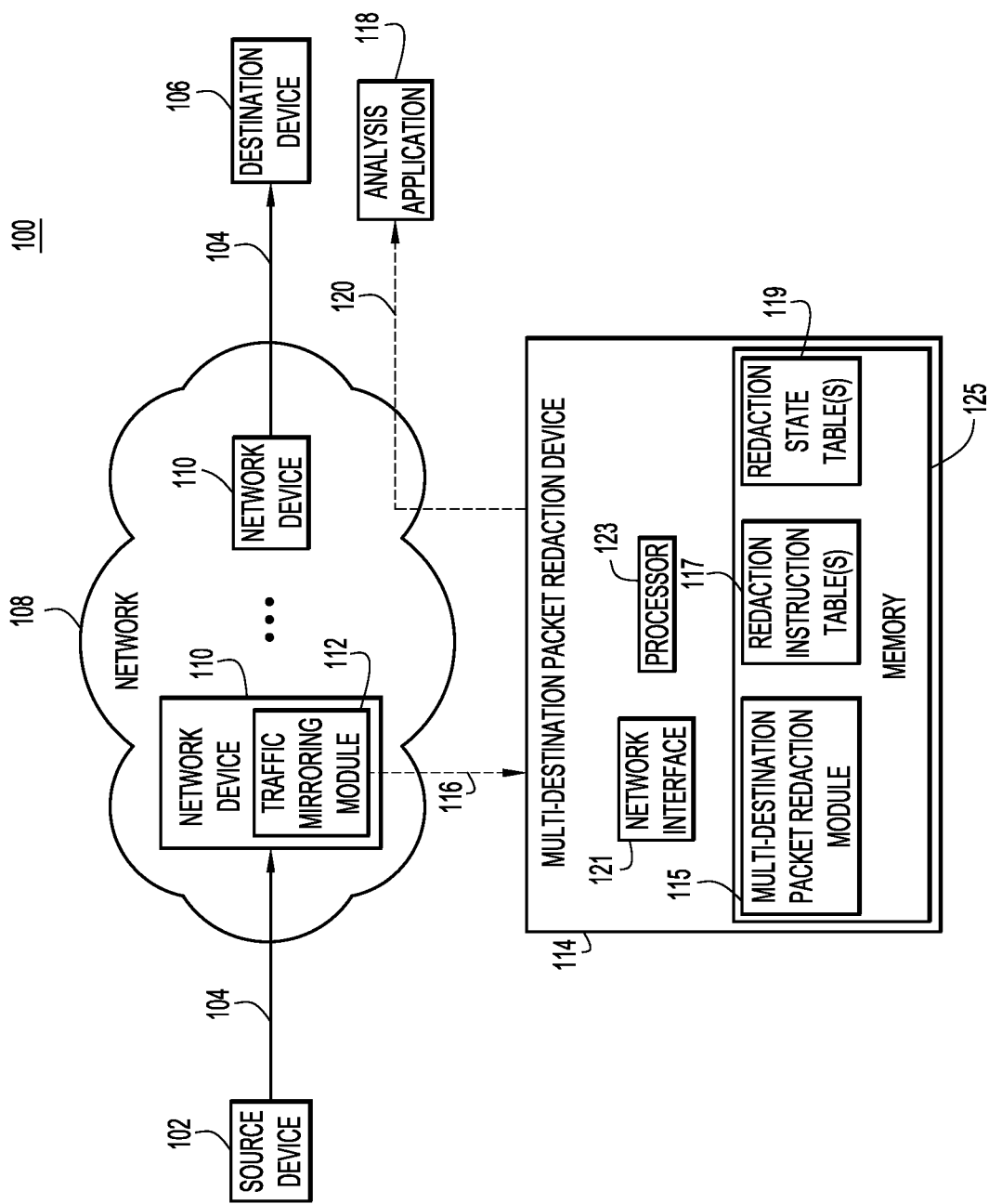
FIG. 1 is a schematic block diagram of a network system environment configured to employ multi-destination packet redaction techniques, according to an example embodiment.

Presented herein are techniques for redacting selected multi-destination network packets (e.g., a subset or portion of multi-destination traffic, such as mirrored/copied packets) prior to providing the selected multi-destination packets to an intended recipient application, such as a third-party analysis application. More specifically, a multi-destination packet redaction device obtains multi-destination network traffic that comprises one or more multi-destination network packets. The multi-destination packet redaction device filters the multi-destination network traffic to determine an intended recipient application of the one or more multi-destination network packets and applies a redaction process to redact one or more portions of at least one of the one or more multi-destination network packets. The redaction process is customized based on one or more attributes of the intended recipient application.

EXAMPLE EMBODIMENTS

There are a number of different types of computing networks that carry network traffic between a source and a destination. One such type of a network is a cloud-based network that is shared by different customers/tenants. In such a multi-tenant cloud network, as well as other types of computing networks, data leak prevention (DLP) is a top priority for the various customers. This is particularly a concern when the cloud/network vendor employs processes/devices/instruments (e.g., optical/electrical taps) to span/mirror/copy customer traffic to one or more third-party analysis/monitoring applications, tools, processes, engines, etc., collectively and generally referred to herein as "intended recipient applications" or "analysis applications." Such applications may be used for any of a number of different functions, such as networking monitoring, network auditing, lawful intercept, etc. For example, the Payment Card Industry (PCI) copies/mirrors transactions to third-party auditing engines for fraud detection Third-party analysis of customer data unknowingly endangers networks and increases the risks that the customer data could be compromised. For example, with reference to the above noted PCI transactions, the PCI-based mirrored traffic includes more information than the third-party requires, such as financial information, which could be maliciously exploited. In other examples, network vendors mirror data with proprietary meta-tags, which may provide competitors with the opportunity to reverse engineer the meta-tags. As a result, third-parties currently have the ability to acquire troves of customer/user data that, in turn, could be analyzed (e.g., by applying Machine Learning algorithms) and resold as metadata/information to circumvent non-disclosure agreements.

Moreover, many modern analysis applications are cloud services that take secure data off-premise. To protect customers and to legally comply with corporate governance and privacy laws, network vendors need to ensure that only the minimal amount of required information is made available to the third-party monitoring/analysis applications. For example, the German Bundesdatenschutzgesetz (BDSG) (Federal Data Protection Act) enacts privacy governance on the exposure of personal data and identification with mandates penalties for non-compliance (i.e., strict enforcement of data transmission by vendors for business continuity).

Presented herein are techniques that use inline redaction of selected multi-destination network packets, such as mirrored packets, to achieve user/customer data privacy and security. More specifically, as described further below, the techniques presented herein apply a redaction process to selected multi-destination network packets. The redaction process is customized to the particular intended recipient application (e.g., analysis application) to which the selected multi-destination traffic is directed. As a result, the analysis application receives only the network data that is relevant to the associated functionality, while the remaining user data is redacted.

The techniques presented herein may be applied to a number of different types of multi-destination traffic. However, merely for ease of illustration and to facilitate understanding, the techniques presented herein are primarily described with reference to one type of multi-destination traffic referred to as "mirrored" traffic.

Referring first to FIG. 1, shown is an example network environment 100 configured to implement the multi-destination packet redaction techniques presented herein. The network environment includes at least one source device 102 that is configured to send network traffic (e.g., packets) 104 to a destination device 106 via a computing network 108. The computing network 108 is a communication system comprised of one or more network devices 110 that link two or more endpoint devices so that the endpoint devices may communicate, share resources, access centrally stored information, etc. In a packet-switched network, such communication occurs through the exchange of packets. As such, computing network 108 enables the transfer of packets from the source device 102 to the destination device 104 and the network devices 110 are devices that use a combination of hardware and/or software to direct packets through the network. The network 108 may comprise/include one or more of a wide area network (WAN), one or more local area networks (LANs), one or more wireless networks, etc.

In the example of FIG. 1, at least one of the network devices 100 includes a traffic mirroring module 112 that is configured to span/mirror/copy network traffic 104 to a multi-destination packet redaction device 114. The mirrored network traffic, which is represented in FIG. 1 by arrow 116, is a copy of the packets within network traffic 104. As such, mirrored network traffic 116 includes the same control information and payload data as the network traffic 104. However, the mirrored network traffic 116 may also include additional control data.

The traffic mirroring module 112 can employ any of a number of techniques to generate mirrored network traffic 116. In one example, the traffic mirroring module 112 uses port mirroring (e.g., Switched Port Analyzer (SPAN), Remote Switched Port Analyzer (RSPAN), Roving Analysis Port (RAP), etc.) to send a copy of network packets seen on a port (or an entire virtual local area network (VLAN)) to a network monitoring connection on another port.

As noted, the mirrored network traffic 116 is sent to multi-destination packet redaction device 114. The multi-destination packet redaction device 114 includes a multi-destination packet redaction module 115 which is configured to perform/execute the multi-destination packet redaction techniques presented herein. That is, the multi-destination packet redaction module 115 is configured to apply an in-line (real-time) redaction process to the mirrored network traffic 116 in order to generate redacted mirrored traffic that is sent to an analysis application (monitoring tool) 118. The redacted mirrored traffic, which is represented in FIG. 1 by arrow 120, is a copy of the network traffic 104 from which portions thereof have been "redacted." As used herein, "packet redaction" or, more simply "redaction," refers to a process in which selected portions of the packets within the mirrored network traffic 116 are censored or obscured before being sent to the analysis application 118.

As described further below, the redaction process employed by the multi-destination packet redaction module 115 is customized to the analysis application 118 (i.e., the tool to which the redacted mirrored traffic 120 is directed). As a result, the analysis application 118 receives only the network data that is relevant to the analysis application 118, while the remaining user data is redacted.

The multi-destination packet redaction device 114 may be embodied by any type of device or system. In the depicted embodiment, the multi-destination packet redaction device 114 includes a network interface 121, one or more processors 123, and a memory 125. The memory 125 comprises the multi-destination packet redaction module 115, one or more redaction instruction tables 117, and one or more a redaction state tables 119.

The one or more processors 123 are, for example, one or more microprocessors or microcontrollers that may communicate with the network interfaces 121 and memory 125. Memory 125 stores software instructions that may be executed by the processors 123. In other words, memory 125 may include instructions, that when executed by one or more processors 123, cause the one or more processors to carry out the operations described herein with reference to multi-destination packet redaction module 115.

Memory 125 may each include read only memory (ROM), random access memory (RAM), magnetic disk storage media devices, optical storage media devices, flash memory devices, electrical, optical or other physical/tangible (e.g., non-transitory) memory storage devices. Thus, in general, the memory 125 may be or include one or more tangible (non-transitory) computer readable storage media (e.g., a memory device) encoded with software comprising computer executable instructions For ease of illustration, FIG. 1 illustrates the multi-destination packet redaction module 115 executed at a device, referred to as the multi-destination packet redaction device 114, which is separate from the network 108. It is to be appreciated that this arrangement is merely one example and that the multi-destination packet redaction module 115 may also or alternatively be a network device 110 within network 108. It is also to be appreciated that the multi-destination packet redaction may be performed at the same device as the traffic mirroring (e.g., the network device 110 that includes the traffic mirroring module 112). It is also to be appreciated that the multi-destination packet redaction module 115 may be implemented in any combination of hardware (i.e., as hardware-based elements, such as digital logic gates in one or more application-specific integrated circuits (ASICs)) and/or software and that the software implementation shown in FIG. 1 is merely one example. Therefore, as used herein, a multi-destination packet redaction device is any computing, networking, or other type of device that is configured to perform/execute the multi-destination packet redaction techniques presented herein (i.e., any device configured with a multi-destination packet redaction module).

Figure 2:
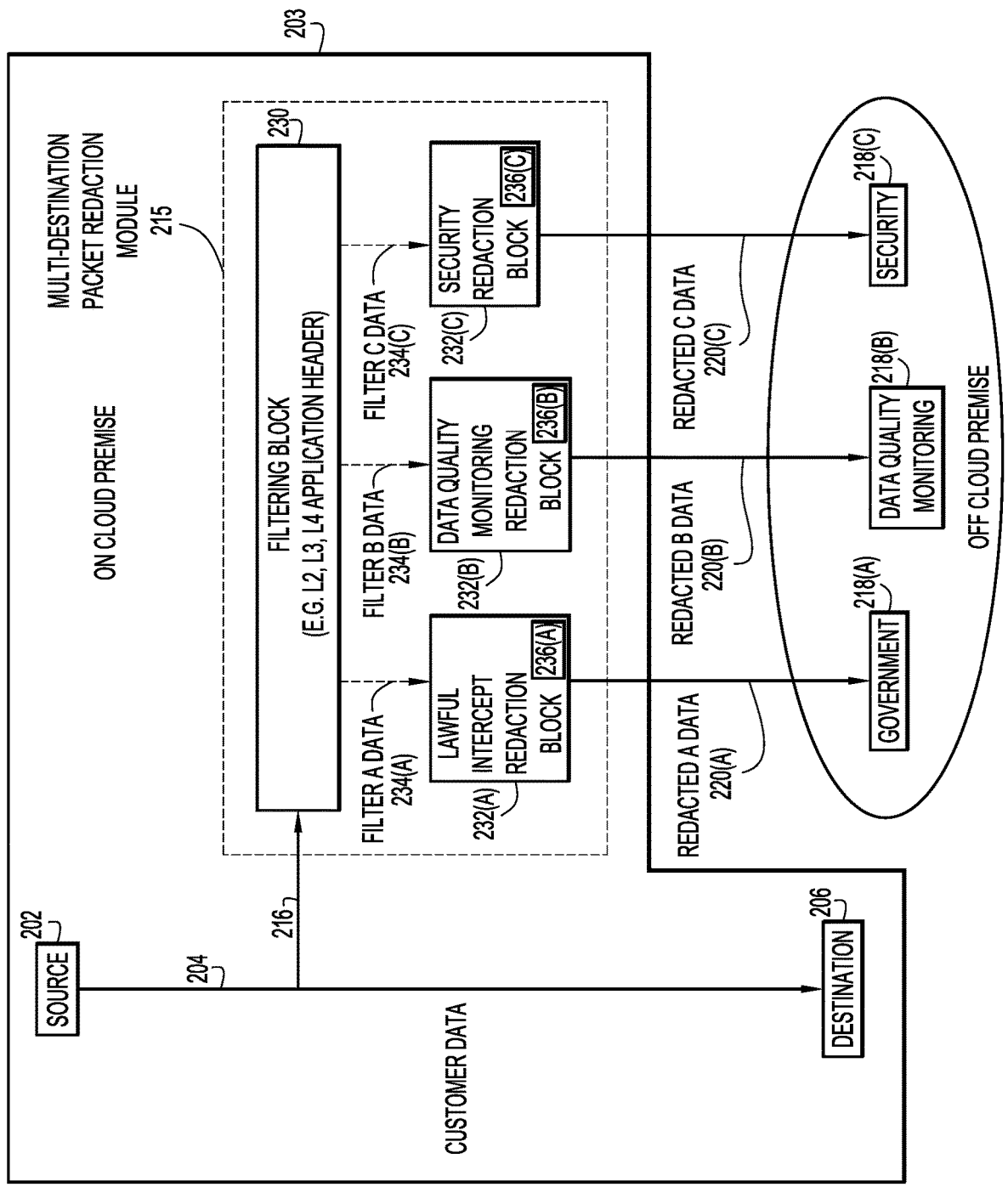
FIG. 2 is a functional block diagram illustrating multi-destination packet redaction techniques, according to an example embodiment.

FIG. 2 is a schematic diagram illustrating further details of the multi-destination packet redaction techniques presented herein. More specifically, FIG. 2 illustrates the functional blocks of a multi-destination packet redaction module 215 in a specific scenario in which network traffic is sent from a source 202 to a destination 206 within a cloud premise 203. The network traffic is represented by arrow 204 and, as described elsewhere herein, includes customer/user specific data and network data (control information). The network data may be utilized by one or more third-party analysis applications for monitoring, auditing, lawful intercept, etc. of the network traffic 204. In FIG. 2, the third-party analysis applications comprise a government lawful intercept application 218(A), a data quality analysis application 218(B), and a security application 218(C). The third-party analysis applications 218(A)-218(C) are located outside of the cloud premise 203.

In the example of FIG. 2, a traffic mirroring process (not shown in FIG. 2) spans/copies/mirrors the network traffic 204 to the multi-destination packet redaction module 215. The mirrored network traffic generated by the traffic mirroring process is represented in FIG. 2 by arrow 216. The multi-destination packet redaction module 215 includes several primary functional blocks that are configured to process the mirrored network traffic 216. These primary functional blocks within the multi-destination packet redaction module 215 include at least one filtering block and one or more redaction blocks. In the specific example of FIG. 2, the multi-destination packet redaction module 215 includes one filtering block 230 and three (3) redaction blocks 232(A), 232(B), and 232(C). As described further below, the redaction block 232(A) is associated with the government lawful intercept application 218(A), redaction block 232(B) is associated with data quality analysis application 218(B), and redaction block 232(C) is associated with security application 218(C).

As noted above, in the example of FIG. 2 there are three different third-party applications 218(A), 218(B), and 218(C) that are each configured to perform some form of analysis in relation to the cloud premise 203. The specific operations performed by each of the analysis applications 218(A), 218(B), and 218(C) may be different and, as such, the network data utilized by each of the analysis applications 218(A), 218(B), and 218(C) may also be different. The network data utilized by each analysis application 218(A), 218(B), and 218(C) may also be obtained from different types of packets, packets from different sources, etc. As such, the filtering block 230 of the multi-destination packet redaction module 215 is configured to use one or more attributes of the mirrored network traffic 216 to determine whether the mirrored network traffic 216 is useable by (i.e., is to be sent to) any of the analysis applications 218(A), 218(B), or 218(C) and to forward the mirrored network traffic 216 to the corresponding redaction block 232(A), 232(B), or 232(C). That is, the filtering block 230 is configured to use attributes of the mirrored network traffic 216 to filter the mirrored network traffic 216 and to forward the network traffic 216, or portions thereof (i.e., specific packets) to one or more of the redaction blocks 232(A), 232(B), and 232(C). In FIG. 2, arrows 234(A), 234(B), and 234(C) represent the filtered data sent to each of the redaction blocks 232(A), 232(B), and 232(C), respectively.

The filtering block 230 may filter the mirrored network traffic 216 using any of a number of different attributes of the mirrored network traffic 216. In one example, the filtering block 230 captures packets having a predetermined type of application payload, such as packets that include a National Association of Securities Dealers Automated Quotations (NASDAQ) OUCH protocol payload, packets that include a FIX Adapted for Streaming (FAST) protocol payload (e.g., employed by portions of the Financial Industry), packets that include an ISO 8583 Financial Transaction Message payload, etc. The filtering block 230 may additionally or alternatively captures packets based on any of a Layer 2 (L2), Layer 3 (L3), Layer 4 (L4) or application header. In general, the filtering process is programmed/controlled based on the requirements of the analysis applications 218(A), 218(B), or 218(C) so that the corresponding redaction block 232(A), 232(B), or 232(C) receive only the packets that are useable by the associated analysis application.

For example, the filtering block 230 may select/identify the packet type for a mirrored packet using information with the received packet, such as a user defined field (UDF), L2, L3, L4 header, and/or other information within the mirrored packet. The filtering block 230 may then apply a user defined mask of bits to ignore, given the identified packet type. The result is then compared to a database to determine if there is a match. If a match is found within the database, then the identified packet type is correct. However, if no match is found, the filtering block 230 can identify a new packet type for the mirrored packet and the above steps are repeated until a match is found within the database.

As noted, the mirrored network traffic 216 is filtered by the filtering block 230 so that packets within the traffic mirrored network traffic 216 are sent to one or more of the redaction block 232(A), 232(B), or 232(C). The redaction blocks 232(A), 232(B), and 232(C) are each configured to perform a redaction process that is specific to (i.e., configured/customized for) the associated third-party analysis application 218(A), 218(B), or 218(C) based on attributes of the analysis application. The attributes of the analysis application may be, for example, the type of data needed by the analysis application to perform its intended function. The redaction processes at the redaction blocks 232(A), 232(B), and 232(C) are implemented so as to redact any portions of a packet that does not include data needed by the associated analysis application. That is, the redaction processes at the redaction blocks 232(A), 232(B), and 232(C) operate to redact predetermined portions of packets received from the filtering block 230, where the predetermined portions of the packets that are to be redacted are selected based on the attributes/properties/characteristics of the associated third-party analysis application 218(A), 218(B), or 218(C). The redaction processes at the redaction blocks 232(A), 232(B), and 232(C) may apply the same or different redaction algorithm.

As noted, the redaction processes applied at the redaction blocks 232(A), 232(B), and 232(C) are generally customized to (i.e., based on) the properties/characteristics of the associated third-party analysis application 218(A), 218(B), or 218(C). It is also to be appreciated that the redaction processes applied at the redaction blocks 232(A), 232(B), and 232(C) may also be customized to (i.e., based on) the sender of the network traffic 204, the recipient of the network traffic 204, the cloud/network vendor, etc. For example, certain customers may wish to protect additional pieces of information with a packet or provide a third-party analysis application with more information than another customer. As such, the data that is to be redacted from a packet can be pre-programmed and tailored to the specific needs of the various associated entities involved with the network traffic, the network, the analysis functions, etc.

The redaction processes at the redaction blocks 232(A), 232(B), and 232(C) may be implemented in any of a number of different manners. In certain examples, the redaction processes at the redaction blocks 232(A), 232(B), and 232(C) are implemented through the use of redaction instruction tables (e.g., firmware instructions/tables, custom instructions, next generation P4 like instructions, etc.) that are each associated with one or more of the third-party analysis application 218(A), 218(B), or 218(C). For example, FIG. 2 illustrates redaction instruction tables 236(A), 236(B), and 236(C), where redaction instruction table 236(A) is used to redact packets that are to be sent to analysis application 218(A), redaction instruction table 236(B) is used to redact packets that are to be sent to analysis application 218(B), and redaction instruction table 236(C) is used to redact packets that are to be sent to analysis application 218(C). In these examples, the redaction instruction tables 236(A), 236(B), and 236(C) comprise a linked/chained list of user-defined redaction instructions that identify packet portions that are to be redacted. The packet portions may be identified as words, bytes, bits, etc. with reference to a packet pointer (i.e., a specific location in the packet). The packet pointer may be, for example, the beginning of the packet payload. In the examples, each redaction instruction within a redaction instruction table also includes offsets to the packet pointer to indicate the start and end of the redaction as well as a pointer to a next redaction instruction. Each redaction instruction table includes a reserved next pointer value (e.g. ~0) to indicate the end of redaction instruction chain.

As noted, the redaction processes may use redaction instruction tables comprised of a linked/chained list of user-defined redaction instructions that identify packet portions that are to be redacted. The packet portions may be identified using a packet pointer. Since different types of packets may have different structures, sizes, formats, etc., the redaction blocks 232(A), 232(B), and 232(C) are aware of the type/structure/format of the packet in the mirrored traffic so that the redaction block can redact the correct portions of the packet. The redaction blocks 232(A), 232(B), and 232(C) may, for example, have different instruction tables for different types of packets or may apply different packet pointer offsets, where the offsets are specific to the type of packet. The packet type may be determined by the filtering block 230 or the redaction blocks 232(A), 232(B), and 232(C).

As noted, FIG. 2 only illustrates three redaction instruction tables 236(A), 236(B), and 236(C). It is to be appreciated that the redaction blocks 232(A), 232(B), and 232(C) may include a plurality of redaction instruction tables, where each table is specific to a certain analysis application, customer, cloud/network vendor, certain packet type/format, etc.

In accordance with examples presented herein, the redaction blocks 232(A), 232(B), and 232(C) may also each include a redaction state table that maintains the "state" of the current flow. The redaction state table is useable to determine whether a received packet is a new packet start or a continuation of a previous packet (i.e., a fragmented packet series). The redaction state table handles application fields carried across multiple packets and contains an offset to adjust the packet pointer for proper redaction instruction table location.

As noted above, in the context of the present application, "packet redaction" or "redaction" refers to a process in which selected portions of a packet are censored or obscured. The redaction instructions may indicate the use of "hard" redaction or "soft" redaction. In hard redaction, all bits within a packet portion that is to be redacted are replaced with a predetermined value (e.g., zero or user defined) and, after the redaction, the redacted data is unrecoverable (i.e., the hard redaction is irreversible). In soft redaction, the data within a packet portion that is to be redacted is obfuscated via a polynomial hash. The use of a polynomial hash is referred to as "soft" redaction because the redacted data could be recovered (i.e., the soft redaction is reversible).

After redaction at the redaction blocks 232(A), 232(B), or 232(C), the multi-destination packet redaction module 215 sends the redacted packets, sometimes referred to herein as redacted mirrored traffic, off-premise to the associated analysis application 218(A), 218(B), or 218(C). In FIG. 2, each redaction block 232(A), 232(B), or 232(C) generates different redacted mirrored traffic represented by arrows 220(A), 220(B), and 220(C), respectively.

In conjunction with the above, in certain examples, the multi-destination packet redaction module 215 may also be configured to compress the redacted packets before the redacted packets are sent off-premise. In such examples, the mirrored traffic 220(A), 220(B), and 220(C) is compressed and includes decompression instructions that can be used to expand and restore the redacted packets during post-processing. The use of compression provides for additional bandwidth and storage savings and is extremely effective with hard redaction that uses constant values as a stream of constant value compresses very well.

In with examples presented herein, the multi-destination packet redaction module 215 filters and redacts the mirrored network traffic inline at line rate, thus the packets are not stored. The operations of the multi-destination packet redaction module 215 preserve the integrity of the original network traffic (the original packets) and the redaction is applied only to copies of the network traffic. In addition, since only the redacted packets are provided to the third-parties, the multi-destination packet redaction module 215 provides cloud data security, while still enabling sufficient monitoring/auditing visibility for privacy and governance. Original network performance is preserved with no growth and shrink of original packet achieving deterministic latency and enables full network analysis.

Figure 3A:
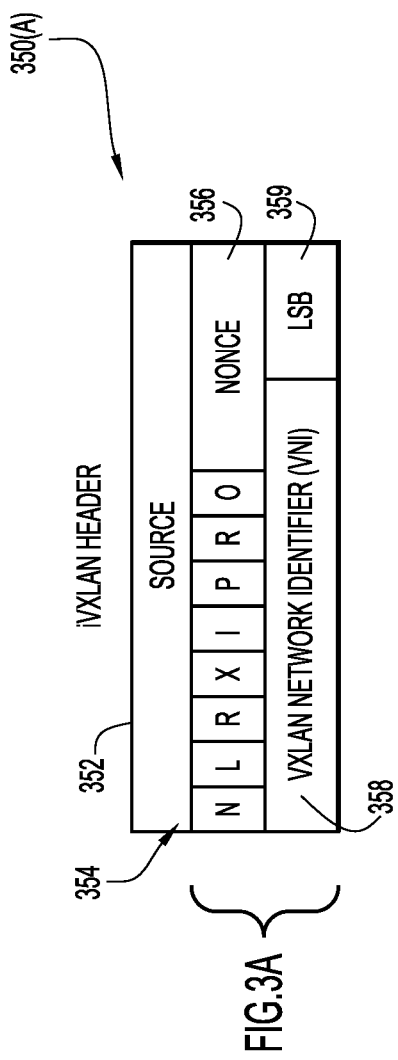
FIG. 3A is a schematic diagram illustrating a multi-destination network packet payload before being processed using the multi-destination packet redaction techniques presented herein, according to an example embodiment.
Figure 3B:
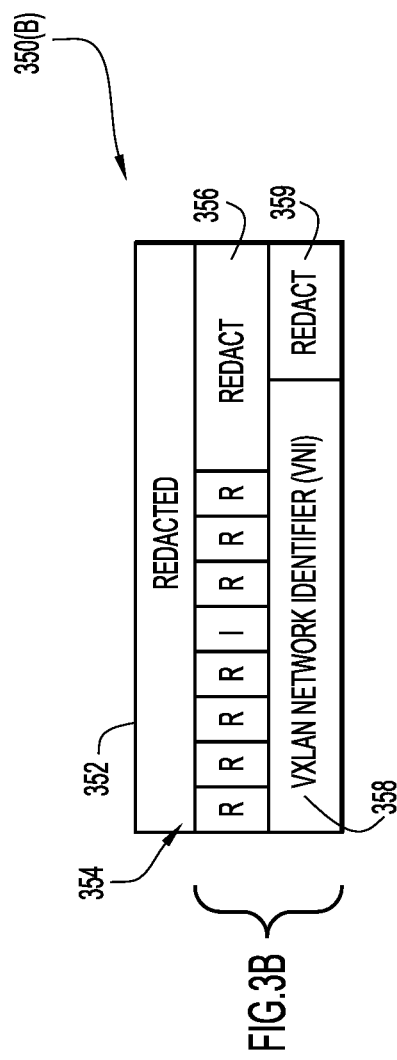
FIG. 3B is a schematic diagram illustrating the multi-destination network packet payload of FIG. 3A after being processed using the multi-destination packet redaction techniques presented herein, according to an example embodiment.

FIGS. 3A and 3B are schematic diagrams illustrating example redaction in accordance with examples presented herein. More specifically, FIG. 3A illustrates one type of Virtual Extensible LAN (VXLAN) header (e.g., iVXLAN header) before redaction, while FIG. 3B illustrates the VXLAN header of FIG. 3A after a multi-destination packet redaction process. The un-redacted version of the VXLAN header in FIG. 3A is referred to as VXLAN header 350(A), while the redacted version of the VXLAN header in FIG. 3B is referred to as VXLAN header 350(B). Although FIGS. 3A and 3B illustrate a "header," in certain examples this "header" is preceded by, for example, an EtherType. As such, in certain contexts, the VXLAN header may be a payload that includes proprietary data that should be redacted before the packet is sent to an analysis application.

For example, as shown in FIG. 3A, the VXLAN header includes a source field 352, a proprietary meta-data field 354, a Nonce field 356, a VXLAN identifier (VNI) field 358, and a Least Significant Bit (LSB) field 359. As shown in FIG. 3B, the source field 352, portions of the proprietary meta-data field 354, the Nonce field 356, and the Least Significant Bit field 359 are all redacted. Therefore, after the redaction process only the VXLAN identifier within field 358, and portions of the proprietary meta-data field 354, are made available to the analysis application.

Figures 4A, 4B:
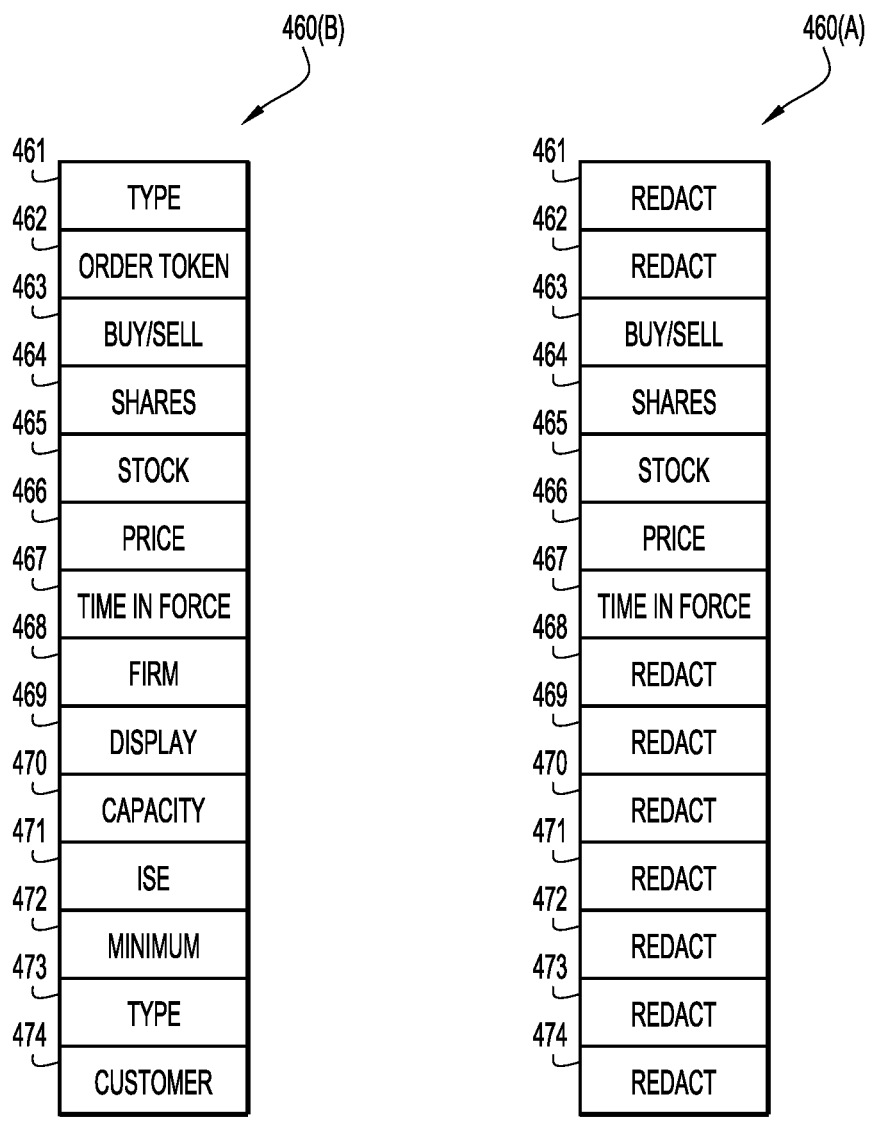
FIG. 4A is a schematic diagram illustrating a multi-destination network packet payload before being processed using the multi-destination packet redaction techniques presented herein, according to an example embodiment.
FIG. 4B is a schematic diagram illustrating the multi-destination network packet payload of FIG. 4A after being processed using the multi-destination packet redaction techniques presented herein, according to an example embodiment.

FIGS. 4A and 4B are schematic diagrams illustrating another example redaction in accordance with examples presented herein. More specifically, FIG. 4A illustrates a NASDAQ OUCH protocol payload before redaction, while FIG. 4B illustrates the NASDAQ OUCH protocol payload of FIG. 4A after a multi-destination packet redaction process. The un-redacted version of the NASDAQ OUCH protocol payload in FIG. 4A is referred to as OUCH protocol payload 460(A), while the redacted version of the OUCH protocol payload in FIG. 4B is referred to as OUCH protocol payload 460(B).

As shown in FIG. 4A, the OUCH protocol payload includes a type field 461, an order token field 462, a buy/sell field 463, a shares field 464, a stock field 465, a price field 466, a time in force field 467, a firm field 468, a display field 469, a capacity field 470, an International Securities Exchange (ISE) field 471, a minimum field 472, a type field 472, and a customer field 474. As shown in FIG. 4B, the fields 461, 462, and 468-474 are all redacted. Therefore, after the redaction process only fields 463-467 are made available to the analysis application.

Figure 6:
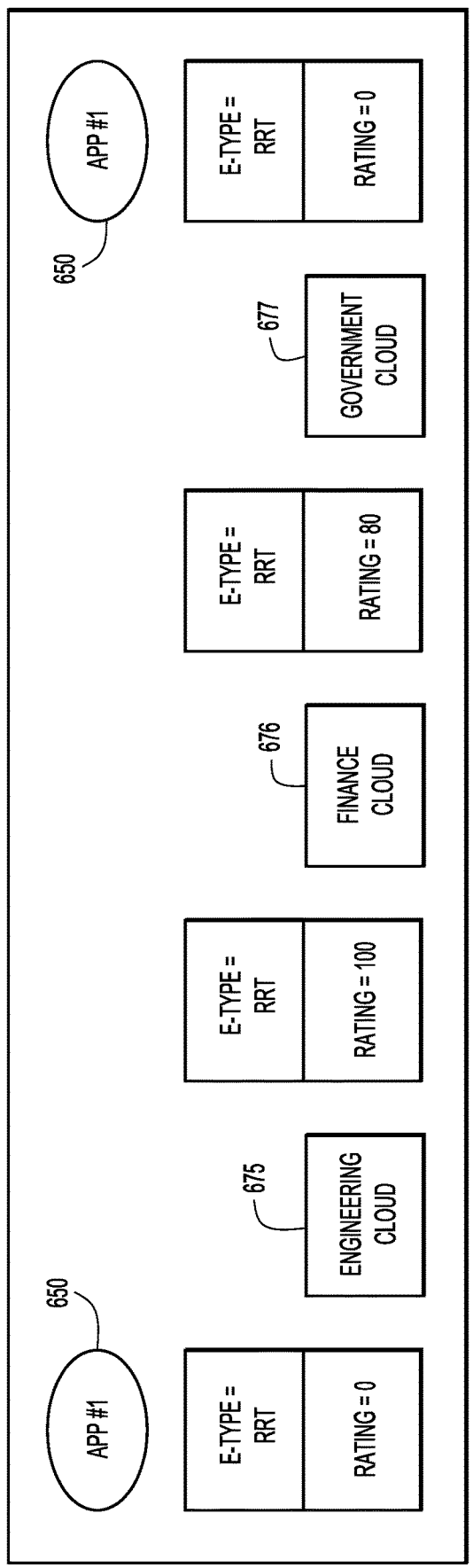
FIG. 6 is a schematic diagram illustrating the use of a Redaction Rating Tag, according to an example embodiment.

In accordance with certain examples presented herein, a system/network wide "Redaction Rating Tag (RRT)" may be incorporated into network packets by the initiating application (APP). The Redaction Rating Tag provides a global value where, when the Redaction Rating Tag is enabled, specifies override of local policy decisions of a device (such as a switch) of maximum redaction allowed. FIGS. 5A, 5B, and 5C generally illustrate the inclusion of a Redaction Rating Tag in three example packets 550(A), 550(B), and 550(C), respectively. As shown, a Redaction Rating Tag may be incorporated into various locations of a network packet. As noted, the Redaction Rating Tag is provided by the initiating application that sets the redaction policy permitted and the RRT Rating is carried out through the life of the packet FIG. 6 is a schematic diagram illustrating use of a Redaction Rating Tag. More specifically, FIG. 6 illustrates an example in which an application (APP) sends a packet 650 that travels from an engineering cloud 675, to a finance cloud 676, and finally to a government cloud 677. The engineering cloud 675 has an RRT rating of 0, meaning no redaction is allowed. The finance cloud 676 has an RRT rating of 100, meaning 100% redaction can be applied. The government cloud has a RRT rating of 80, meaning up to 80% redaction can be applied. The permitted redaction is maximum percentage of the total packet.

Figure 7:
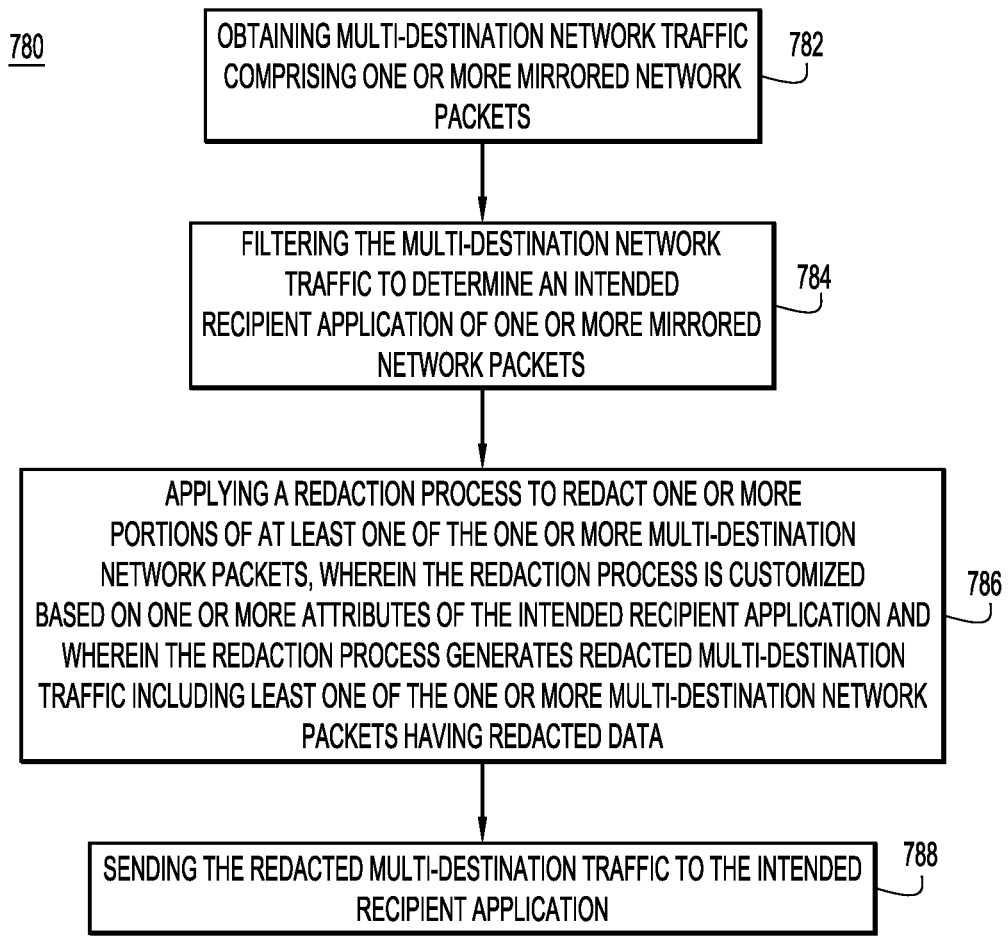
FIG. 7 is a flowchart of a multi-destination packet redaction method, according to an example embodiment.

FIG. 7 is a flowchart of a multi-destination traffic redaction method 780 performed at a device having connectivity to a network. The method 780 begins at 782 where the device obtains multi-destination network traffic comprising one or more multi-destination network packets. At 784, the device filters the multi-destination network traffic to determine an intended recipient application of the one or more multi-destination network packets. At 786, the device applies a redaction process to redact one or more portions of at least one of the one or more multi-destination network packets, wherein the redaction process is customized based on one or more attributes of the intended recipient application and wherein the redaction process generates redacted multi-destination traffic including least one of the one or more multi-destination network packets having redacted data. At 788, the device sends the redacted multi-destination traffic to the intended recipient application.

As described above, to ensure service-level agreement (SLA) compliance, uptime, and 99.9 . . . 9% guarantees, cloud customers are subjected to data intercept by numerous third party vendors (firewall, load balancers, analytics, audit, sniffers, monitors, etc.). Unknowingly, numerous privacy guarantees are violated between cloud providers and their customers and even more so, those cloud consumers' end customer. Certain third-parties may be data hungry and eager to resell data for any price. As such, the techniques presented herein use customizable in-line packet redaction to ensure that only the necessary and agreed data are transmitted to a third-party party, wherein the redaction is customizable by. The techniques may be beneficial in that the use of redaction, at least hard redaction, cannot be reversed engineered and ensures data leak prevention, and compliance with privacy, corporate and/or user agreements. The techniques presented herein may also eliminate the need for offload engine processing that adds latency and touch point.

In one form, a method is performed at a device having connectivity to a network is provided. The method comprises: obtaining multi-destination network traffic comprising one or more multi-destination network packets; filtering the multi-destination network traffic to determine an intended recipient application of the one or more multi-destination network packets; applying a redaction process to redact one or more portions of at least one of the one or more multi-destination network packets, wherein the redaction process is customized based on one or more attributes of the intended recipient application and wherein the redaction process generates redacted multi-destination traffic including least one of the one or more multi-destination network packets having redacted data; and sending the redacted multi-destination traffic to the intended recipient application.

In another form, device is provided. The device comprises: a network interface configured to enable connectivity to a network; a memory; and one or more processors coupled to the network interface and the memory, and configured to: obtain multi-destination network traffic comprising one or more multi-destination network packets; filter the multi-destination network traffic to determine an intended recipient application of the one or more multi-destination network packets; apply a redaction process to redact one or more portions of at least one of the one or more multi-destination network packets, wherein the redaction process is customized based on one or more attributes of the intended recipient application and wherein the redaction process generates redacted multi-destination traffic including least one of the one or more multi-destination network packets having redacted data; and send the redacted multi-destination traffic to the intended recipient application.

In another form, one or more non-transitory computer readable storage media at a device having connectivity to a network are provided. The non-transitory computer readable storage media are encoded with instructions that, when executed by a processor, cause the processor to: obtain multi-destination network traffic comprising one or more multi-destination network packets; filter the multi-destination network traffic to determine an intended recipient application of the one or more multi-destination network packets; apply a redaction process to redact one or more portions of at least one of the one or more multi-destination network packets, wherein the redaction process is customized based on one or more attributes of the intended recipient application and wherein the redaction process generates redacted multi-destination traffic including least one of the one or more multi-destination network packets having redacted data; and send the redacted multi-destination traffic to the intended recipient application.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
generating, based on multi-destination network traffic comprising one or more multi-destination network packets, mirrored multi-destination network traffic comprising one or more mirrored multi-destination network packets;
filtering the mirrored multi-destination network traffic to determine an intended recipient application of the one or more mirrored multi-destination network packets, wherein the mirrored multi-destination network traffic is filtered without storing the mirrored multi-destination network traffic;
applying a redaction process to redact one or more portions of at least one of the one or more mirrored multi-destination network packets to generate redacted multi-destination traffic including at least one of the one or more mirrored multi-destination network packets having redacted data, wherein the redaction process is applied without storing the at least one of the one or more mirrored multi-destination network packets; and
sending the redacted multi-destination traffic to the intended recipient application.

2. The method of claim 1, wherein filtering the mirrored multi-destination network traffic comprises:
analyzing one or more attributes of the one or more mirrored multi-destination network packets to determine whether the one or more mirrored multi-destination network packets are useable by the intended recipient application.

3. The method of claim 1, wherein filtering the mirrored multi-destination network traffic comprises:
capturing packets having a predetermined type of application payload.

4. The method of claim 1, wherein filtering the mirrored multi-destination network traffic comprises:
identifying a packet type of at least one of the one or more mirrored multi-destination network packets;
applying, based on the identified packet type, a user defined mask indicating a number of bits to ignore for the at least one of the one or more mirrored multi-destination network packets;
determining, based on a result of applying the user defined mask, whether there is a match to a stored packet type;
based on determining that there is a match to a stored packet type, confirming that the identified packet type is correct; and
based on determining that there is not a match to a stored packet type, identifying a new packet type and repeating the applying and the determining until a match is determined.

5. The method of claim 1, wherein the redaction process is customized based on one or more attributes of the intended recipient application.

6. The method of claim 5, wherein applying a redaction process to redact one or more portions of at least one of the one or more mirrored multi-destination network packets comprises:
applying a redaction process that is also based on attributes including one or more of: a sender of original network traffic that was used to generate the mirrored multi-destination network traffic, a recipient of the original network traffic, or a vendor of a computing network used to carry the original network traffic.

7. The method of claim 5, wherein applying a redaction process to redact one or more portions of at least one of the one or more mirrored multi-destination network packets comprises:
applying one or more redaction instruction tables associated with the intended recipient application, wherein the one or more redaction instruction tables each comprise a chained list of user-defined redaction instructions that identify packet portions that are to be redacted.

8. The method of claim 7, further comprising:
identifying a type of the one or more mirrored multi-destination network packets to determine an offset to a packet pointer for the identified type of the one or more mirrored multi-destination network packets.

9. The method of claim 1, wherein applying a redaction process to redact one or more portions of at least one of the one or more mirrored multi-destination network packets comprises:
determining, based on a redaction state table maintained for the mirrored multi-destination network traffic, whether at least one of the one or more mirrored multi-destination network packets is a new packet start or a continuation of a previous packet; and
adjusting an offset to a packet pointer based on determining that the at least one of the one or more mirrored multi-destination network packets is a continuation of a previous packet.

10. The method of claim 1, wherein applying a redaction process to redact one or more portions of at least one of the one or more mirrored multi-destination network packets comprises one of:
applying hard redaction to the one or more portions of the at least one of the one or more mirrored multi-destination network packets to replace all bits within a packet portion that is to be redacted with a predetermined value; and
applying soft redaction to the one or more portions of the at least one of the one or more mirrored multi-destination network packets to obfuscate, via a polynomial hash, all bits within a packet portion that is to be redacted.

11. The method of claim 1, further comprising:
compressing the redacted multi-destination traffic before the redacted multi-destination traffic is sent to the intended recipient application.

12. The method of claim 1, further comprising:
incorporating a Redaction Rating Tag into original network traffic that was used to generate the mirrored multi-destination network traffic, wherein the Redaction Rating Tag provides a global value that, when enabled, specifies override of a maximum redaction allowed at a recipient device.

13. A device comprising:
a network interface configured to enable connectivity to a network;
a memory; and
one or more processors coupled to the network interface and the memory, and configured to:
   generate, based on multi-destination network traffic comprising one or more multi-destination network packets, mirrored multi-destination network traffic comprising one or more mirrored multi-destination network packets;
   filter the mirrored multi-destination network traffic to determine an intended recipient application of the one or more mirrored multi-destination network packets, wherein the mirrored multi-destination network traffic is filtered without storing the mirrored multi-destination network traffic;
   apply a redaction process to redact one or more portions of at least one of the one or more mirrored multi-destination network packets to generate redacted multi-destination traffic including at least one of the one or more mirrored multi-destination network packets having redacted data, wherein the redaction process is applied without storing the at least one of the one or more mirrored multi-destination network packets; and
   send the redacted multi-destination traffic to the intended recipient application.

14. The device of claim 13, wherein to filter the mirrored multi-destination network traffic, the one or more processors are configured to:
   analyze one or more attributes of the one or more mirrored multi-destination network packets to determine whether the one or more mirrored multi-destination network packets are useable by the intended recipient application.

15. The device of claim 13, wherein to filter the mirrored multi-destination network traffic, the one or more processors are configured to:
   capture packets having a predetermined type of application payload.

16. The device of claim 13, wherein to filter the mirrored multi-destination network traffic, the one or more processors are configured to:
   identify a packet type of at least one of the one or more mirrored multi-destination network packets;
   apply, based on the identified packet type, a user defined mask indicating a number of bits to ignore for the at least one of the one or more mirrored multi-destination network packets;
   determine, based on a result of applying the user defined mask, whether there is a match to a stored packet type;
   based on determining that there is a match to a stored packet type, confirm that the identified packet type is correct; and
   based on determining that there is not a match to a stored packet type, identify a new packet type and repeating the applying and the determining until a match is determined.

17. The device of claim 13, wherein to apply a redaction process to redact one or more portions of at least one of the one or more mirrored multi-destination network packets, the one or more processors are configured to:
   determine, based on a redaction state table maintained for the mirrored multi-destination network traffic, whether at least one of the one or more mirrored multi-destination network packets is a new packet start or a continuation of a previous packet; and
   adjust an offset to a packet pointer based on determining that the at least one of the one or more mirrored multi-destination network packets is a continuation of a previous packet.

18. The device of claim 13, wherein to apply a redaction process to redact one or more portions of at least one of the one or more mirrored multi-destination network packets, the one or more processors are configured to apply one of:
   hard redaction to the one or more portions of the at least one of the one or more mirrored multi-destination network packets to replace all bits within a packet portion that is to be redacted with a predetermined value; or
   soft redaction to the one or more portions of the at least one of the one or more mirrored multi-destination network packets to obfuscate, via a polynomial hash, all bits within a packet portion that is to be redacted.

19. One or more non-transitory computer readable storage media at a device having connectivity to a network, wherein the non-transitory computer readable storage media are encoded with instructions that, when executed by a processor, cause the processor to:
   generate, based on multi-destination network traffic comprising one or more multi-destination network packets, mirrored multi-destination network traffic comprising one or more mirrored multi-destination network packets;
   filter the mirrored multi-destination network traffic to determine an intended recipient application of the one or more mirrored multi-destination network packets, wherein the mirrored multi-destination network traffic is filtered without storing the mirrored multi-destination network traffic;
   apply a redaction process to redact one or more portions of at least one of the one or more mirrored multi-destination network packets to generate redacted multi-destination traffic including at least one of the one or more mirrored multi-destination network packets having redacted data, wherein the redaction process is applied without storing the at least one of the one or more mirrored multi-destination network packets; and
   send the redacted multi-destination traffic to the intended recipient application.

20. The non-transitory computer readable storage media of claim 19, wherein the instructions operable to filter the mirrored multi-destination network traffic include instructions operable to:
   identify a packet type of at least one of the one or more mirrored multi-destination network packets;
   apply, based on the identified packet type, a user defined mask indicating a number of bits to ignore for the at least one of the one or more mirrored multi-destination network packets;

determine, based on a result of applying the user defined mask, whether there is a match to a stored packet type;

based on determining that there is a match to a stored packet type, confirm that the identified packet type is correct; and based on determining that there is not a match to a stored packet type, identify a new packet type and repeating the applying and the determining until a match is determined.

* * * * *